United States Patent Office.

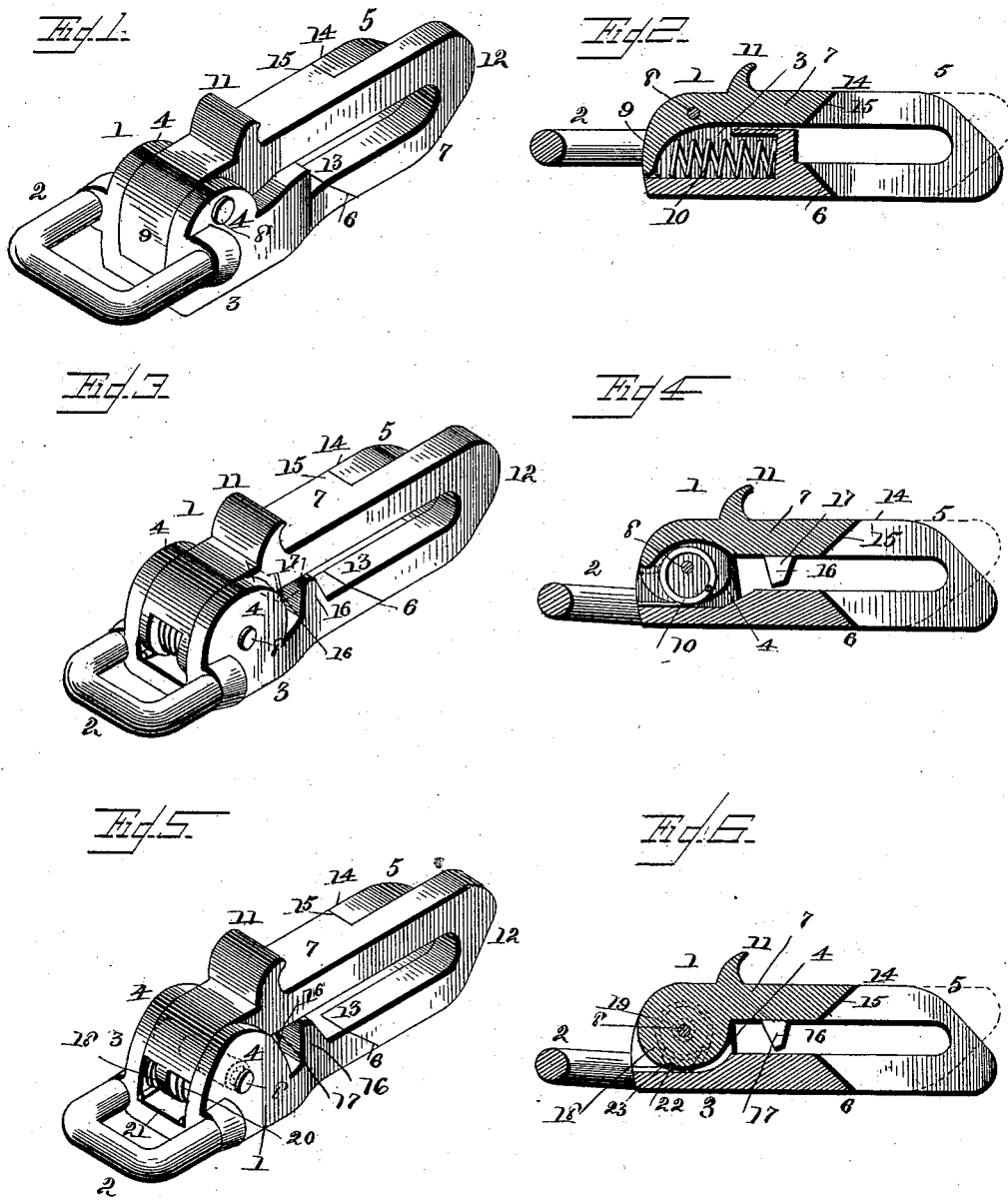

EVERAL BRADLEY, OF TRUMANSBURG, NEW YORK.

SNAP-HOOK.

SPECIFICATION forming part of Letters Patent No. 364,572, dated June 7, 1887.

Application filed March 19, 1887. Serial No. 231,484. (No model.)

*To all whom it may concern:*

Be it known that I, EVERAL BRADLEY, a citizen of the United States, and a resident of Trumansburg, in the county of Tompkins and State of New York, have invented certain new and useful Improvements in Snap-Hooks; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved snap-hook. Fig. 2 is a longitudinal sectional view of the same. Fig. 3 is a perspective view of a modified form of the hook, showing portions in dotted lines. Fig. 4 is a longitudinal sectional view of the same. Fig. 5 is a perspective view of another modified form of the hook, and Fig. 6 is a longitudinal sectional view of this form.

Similar numerals of reference indicate corresponding parts in all the figures.

My invention has relation to that class of snap-hooks in which the ends of the hooks are beveled, and in which the hooks are placed at the side of one another with their hooked portions projecting in opposite directions and forced together by means of springs at their inner ends; and it consists in the improved construction and combination of parts of such a snap-hook, as hereinafter more fully described and claimed.

In the accompanying drawings, the numeral 1 indicates the body portion of the hook, which is formed with a wide loop, 2, for the attachment of a strap or chain, and is formed with a box, 3, having two transversely-perforated lips, 4, at its rear end, and covered at all sides, excepting at the rear end and at the rear portion of the upper side. The forward end of this box has the hook 5 projecting from it, and the width of this hook is one-half of the width of the box, the box having a beveled shoulder, 6, at one side of the hook, and the outer doubled end of the hook is inclined or beveled toward the free end of the hook, and the said end of the hook is beveled outward.

The movable hook 7 is pivoted with its inner portion upon a bolt, 8, passing through the perforated ears and through the hook, and is provided at that end with a downwardly-projecting lip, 9, which bears against the rear end of a coiled spring, 10, having its forward end inclosed in the box of the other hook portion, and the upper side of the movable hook is formed with a finger piece or lip, 11, against which the finger may be pressed and the hook opened.

The outer hooked portion of the movable hook portion is formed with an inclined doubled end, 12, and with a beveled free end, 13, which may bear against the inclined or beveled shoulder of the stationary portion of the hook, the movable portion of the hook having its hooked portion reduced in width similar to the stationary portion, the beveled end 14 of the hook of the stationary portion bearing against the beveled shoulder 15 of the movable portion, while the inclined doubled ends of the hooks are inclined in opposite directions, forming a V-shaped notch between the outer ends when the hook is closed, so that a ring or other object pressed against the inclined ends will wedge or force the hooks apart.

It will thus be seen that the hook may be secured to a ring or other similar object by pressing the inclined ends of the hooks against the ring, the ring entering between the hooks spreading them apart, and when the ring has entered between the hooks it will bear against the forward end of the box, allowing the spring to force the hooks together, and as the ring is now drawn out into the doubled ends of the hooks it will serve to keep the hooks closed, so that the hooks may only be opened by sliding the ring back against the end of the box, and thereupon opening the hooks by pressing upon the finger-piece. The beveled ends of the hooks will bear against the beveled shoulders of the hook portions, and both hooks will form a perfectly-closed loop while the ring remains between their hooked portions.

In Figs. 3 and 4 are shown views of a hook having the same shape for the hooked portions, and having the loop for the strap or chain; but the portion pivoted upon the bolt is formed with two perforated ears, with which it is pivoted upon the bolt, and between which a coiled spring is secured upon the same, one end of the spring bearing against the rear end of the movable portion and one end of the spring bearing against the stationary portion.

A lug, 16, projects from the inner side of each hook portion, forming a stop for the ring in the place of the forward end of the box in the other form, and the inner faces, 17, of these lugs are beveled and fit tightly against each other.

The form shown in Figs. 5 and 6 has the hook portions and the beveled lugs similar to the form above described; but the inner end of the movable hook portion is provided with a downwardly-projecting lip, 18, having sleeves 19 projecting from the sides of the lip and fitting upon the pivotal bolt, and the coiled portions 20 of a spring, 21, are coiled around these sleeves and have the central bail-shaped portion, 22, bearing into a notch, 23, in the rear end of the lip, and have the ends bearing against the inner side of the stationary hook portion. The operation of these forms of the hook is similar to the operation of the form first described, and the springs in all the forms will serve to close the hooks together, while the beveled lugs upon the two last-described forms will serve as stops for the ring in the same manner as the forward end of the box in the first-described form.

Having thus described my invention, I claim and desire to secure by Letters Patent of the United States—

1. In a snap-hook, the combination of a body portion having ears at one end and a hook at the other, a spring actuated movable portion pivotally secured upon said ears at one end, and having a hook at the other, the outer doubled ends of said hooks being beveled, said beveled portions facing in opposite directions, forming a V-shaped notch between the outer ends when the hook is closed, and means, substantially as described, for securing the body portion to the end of a strap.

2. In a snap-hook, the combination of a body portion, one end of which is provided with a box and the other with a hook, a movable portion pivotally secured to said box at one end, and having a hook at the other, said hooks being reduced, and having their outer doubled ends beveled, said beveled portions facing in opposite directions, a spring within said box, and means, substantially as described, for securing said body portion to the end of a strap.

3. In a snap-hook, the combination of a body portion, one end of which is provided with a box and the other end with a hook, and having its intermediate portion upon one side provided with a beveled shoulder, a movable portion pivotally secured near one end upon said box, one end of said movable portion being provided with a downwardly-projecting lip and the other end with a hook, the intermediate portion of said movable portion being provided intermediate its ends with a beveled shoulder upon one side and a spring within said box, one end of which is adapted to bear against said lip, and means, substantially as described, for securing the body portion to the end of a strap.

In testimony that I claim the foregoing as my own I have hereunto affixed my signature in presence of two witnesses.

EVERAL BRADLEY.

Witnesses:
DAVID S. PRATT,
HARRY H. SEYMOUR.